May 29, 1956 R. F. McLEAN 2,747,923
RETRACTABLE REAR WINDOW FOR AN AUTOMOBILE
Filed Feb. 10, 1951 4 Sheets-Sheet 1

Inventor
Robert F. McLean
By
Willits, Helwig & Baillio
Attorneys

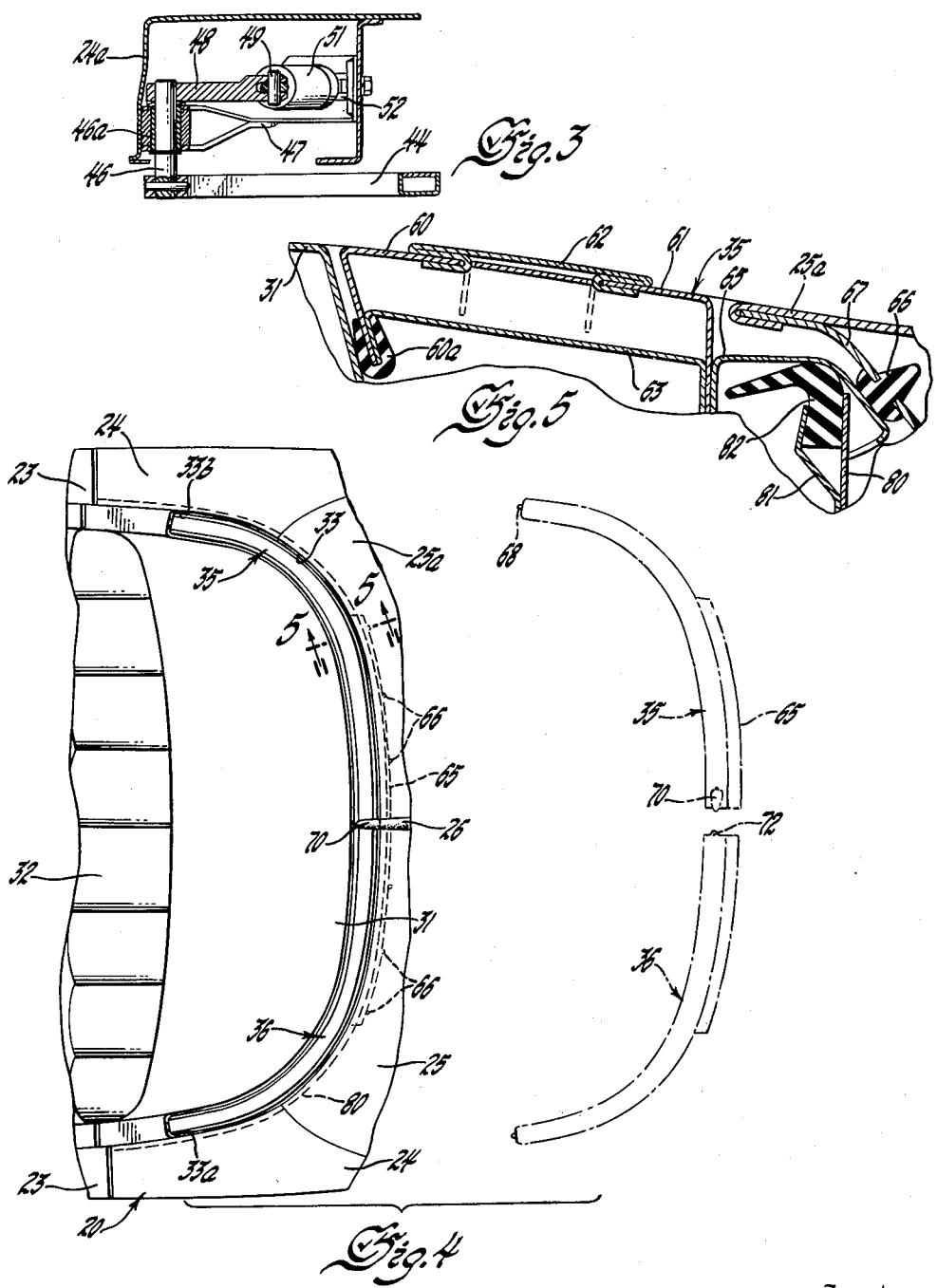

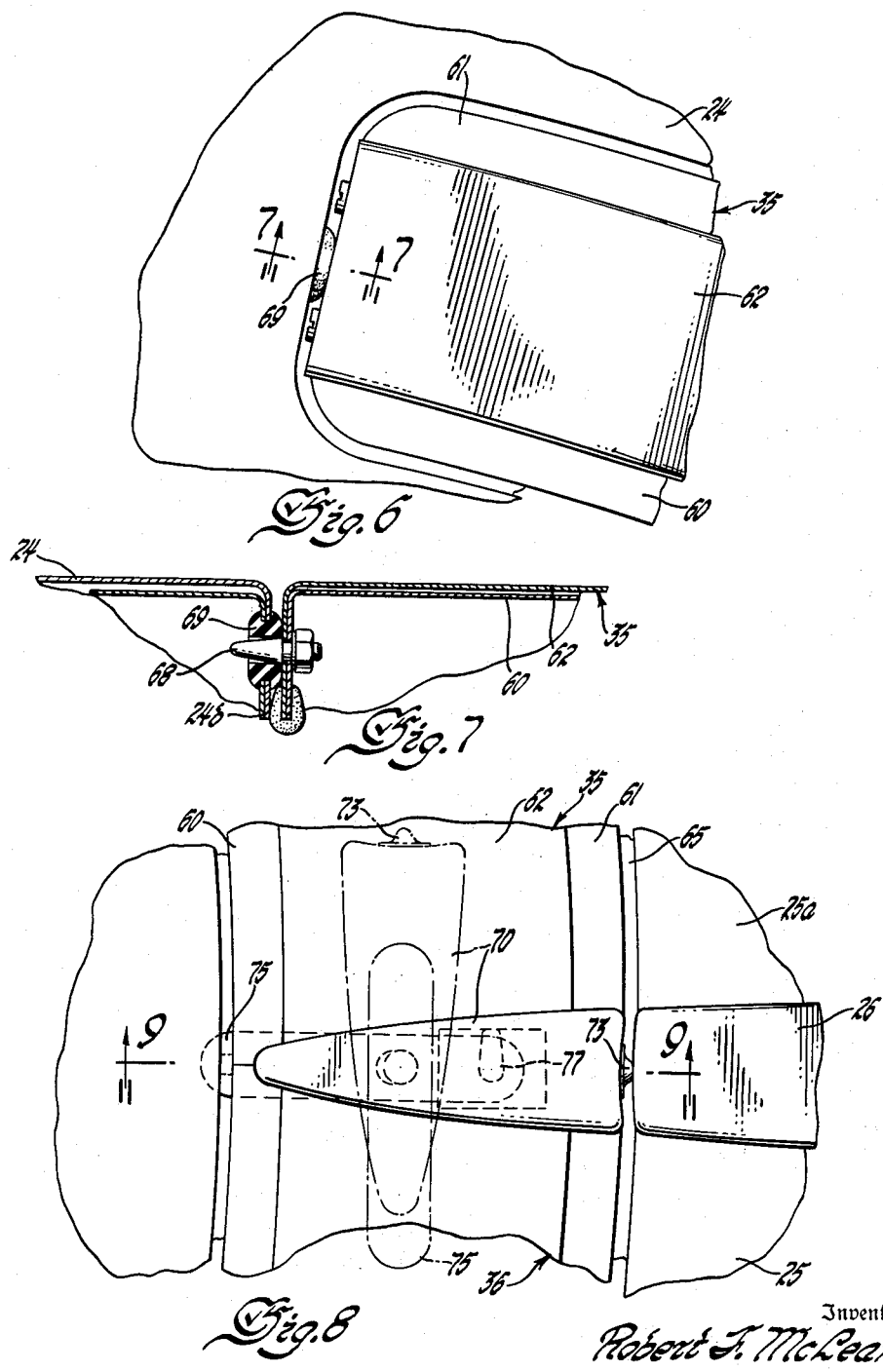

May 29, 1956  R. F. McLEAN  2,747,923
RETRACTABLE REAR WINDOW FOR AN AUTOMOBILE
Filed Feb. 10, 1951  4 Sheets-Sheet 4
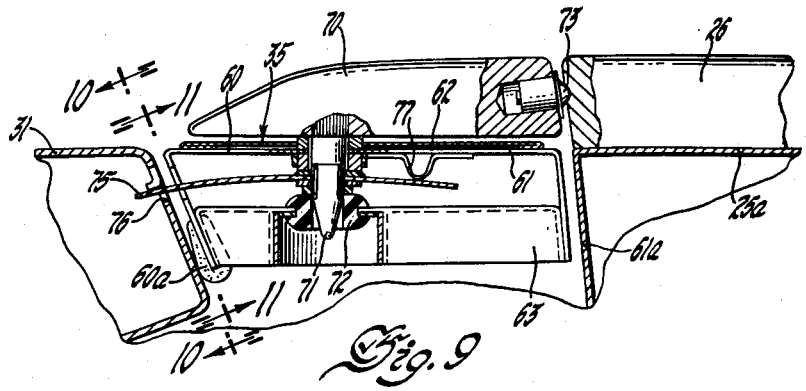
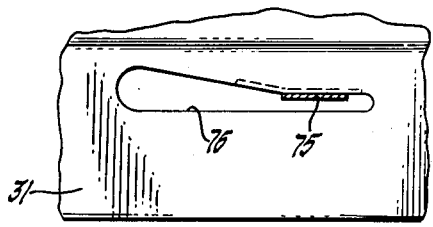
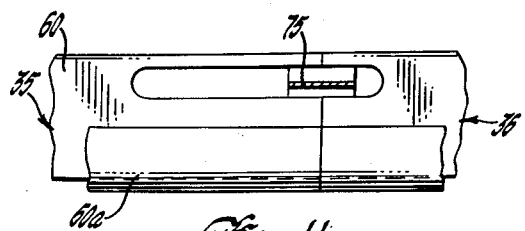
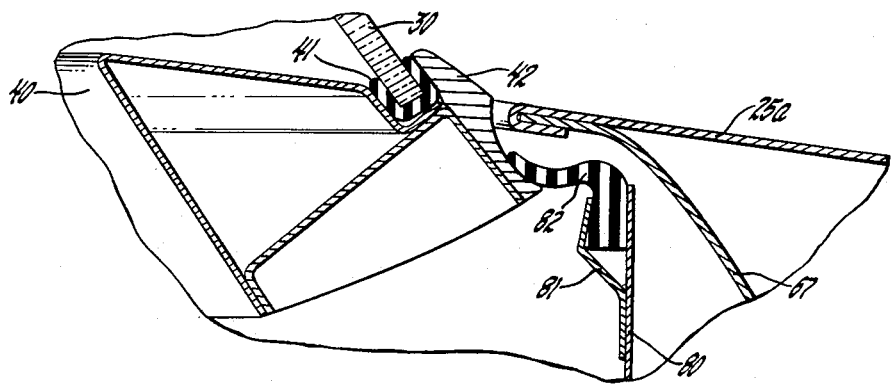
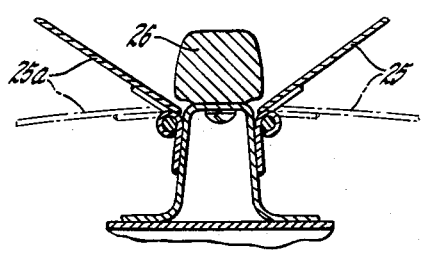
Inventor
Robert F. McLean
By Willits, Helwig & Bailleo
Attorneys 2,747,923
Patented May 29, 1956

2,747,923

RETRACTABLE REAR WINDOW FOR AN AUTOMOBILE

Robert F. McLean, Detroit, Mich., assignor to General Motors Corporation, Detroit, Mich., a corporation of Delaware Application February 10, 1951, Serial No. 210,306

9 Claims. (Cl. 296—44)

This invention relates to an automobile rear window construction, and more particularly to a retractable rear window.

One feature of the invention is that it provides an improved retractable rear window for an automobile; another feature of the invention is that it provides a rear window which is movable between a retracted position wherein said window is within an opening in the rear deck of the automobile body and entirely below the surface of said deck, and an extended position wherein said window projects out of said opening above said deck; a further feature of the invention is that a removable cover is provided for closing the opening in the deck when the window is in retracted position; still another feature of the invention is that the retractable window is cresent-shaped, said window extending transversely of and substantially across the automobile body and having end portions extending in directions forwardly of said body; yet a further feature of the invention is that the crescent-shaped window moves between retracted and extended positions about an axis of rotation; and yet another feature of the invention is that hydraulic means are provided for moving the window along an arcuate path between retracted and extended positions.

Figure 1:
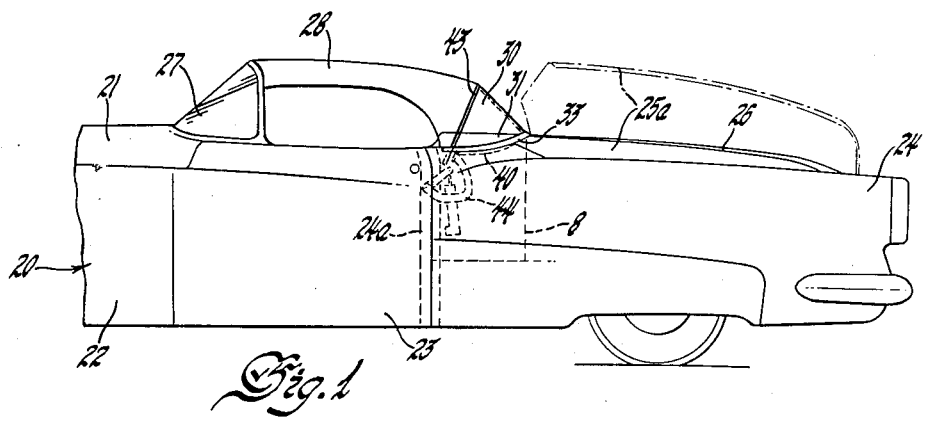
Figure 2:
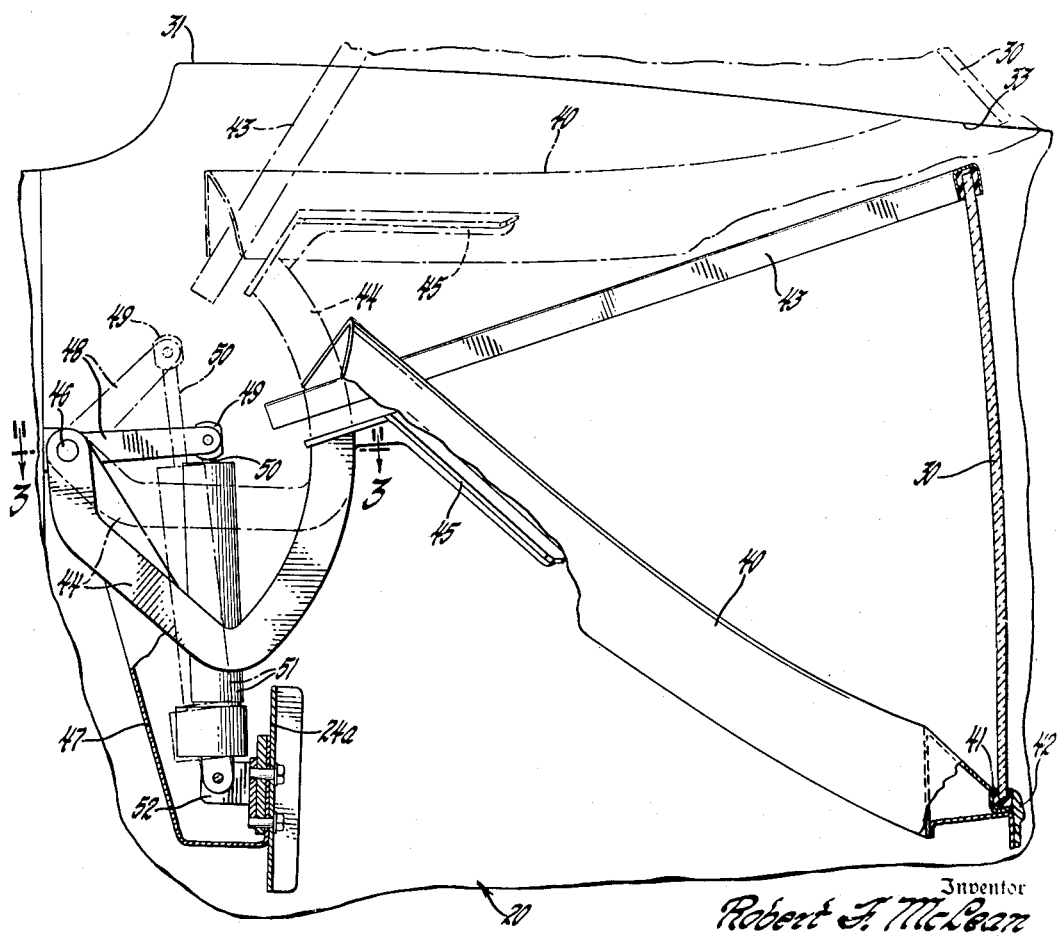

Other features and advantages of the invention will be apparent from the following description and from the drawings in which:

Fig. 1 is a fragmentary side elevational view of an automobile having the improved retractable rear window, parts being shown in solid lines in one position and broken lines in another position; Fig. 2 is an enlarged fragmentary longitudinal section through a portion of the apparatus of Fig. 1; Fig. 3 is a fragmentary horizontal section along the line 3—3 of Fig. 2; Fig. 4 is an enlarged fragmentary top plan view of a portion of the automobile of Fig. 1 with the window in retracted position, the panel which covers the window opening being shown removed in broken lines; Fig. 5 is an enlarged transverse section in broken lines; Fig. 5 is an enlarged transverse section taken along the line 5—5 of Fig. 4; Fig. 6 is an enlarged fragmentary top plan view showing one end of the panel in association with the automobile body; Fig. 7 is a fragmentary section along the line 7—7 of Fig. 6; Fig. 8 is an enlarged fragmentary top plan view showing the center portion of the panel in association with the automobile body, parts being shown in solid lines in one position and in broken lines in another position; Fig. 9 is a fragmentary transverse section along the line 9—9 of Fig. 8; Fig. 10 is a section along the line 10—10 of Fig. 9; Fig. 11 is a section along the line 11—11 of Fig. 9; Fig. 12 is an enlarged fragmentary section similar to Fig. 5, but with the window in extended position; and Fig. 13 is a fragmentary section through the center rear portion of the automobile.

In conventional automobile construction closed model automobiles are provided with a steel top having the rear window permanently mounted and sealed closed. Convertible model automobiles are generally provided with a flexible top which is movable between open and closed positions, and the rear window usually comprises a small, generally plane transparent member permanently mounted in the movable top. When the top is up the window is sealed closed as in conventional steel top models, and when the top is open the window is folded down with the fabric top.

It is desirable to provide a rear window which may be moved between retracted and extended positions independently of the position of the top of the automobile. The present invention provides a novel rear window construction wherein the rear window may be retracted to give the effect of a conventional convertible model with the top down, and wherein the window may be moved to an extended position wherein it extends above the rear deck surface. A top may be provided to close the passenger compartment, or the top may be left open.

Referring now more particularly to the drawings, the body of an automobile is designated generally at 20 in Figs. 1, 2, and 4. The automobile body has a hood 21, front fenders 22, doors 23, rear fenders 24 and rear quarter panels 25 and 25a. The doors may be locked to rear door pillars 24a in conventional manner. Together, portions of the rear fenders 24 and rear quarter panels 25 and 25a form a rear deck having a generally horizontal surface portion with a trim strip 26 extending longitudinally along the center thereof. The rear quarter panels 25 and 25a are hinged adjacent the longitudinal center line of the automobile and may be opened as shown in Fig. 13. The automobile has a front windshield 27 and is shown as being provided with a convertible type top 28 which may be secured at the front end to the windshield 27 and which may be secured at the rear end to the door pillar 24a, conventional securing means being utilized. A portion 31 of the rear deck extends forwardly of the rear window within the cockpit or passenger compartment of the said automobile, said portion 31 terminating at the seat back 32 (see Fig. 4).

According to the present invention, that portion of the fenders and rear quarter panels which form the generally horizontal rear deck surface immediately outside the automobile passenger compartment is provided with a narrow, elongated opening 33, said opening extending transversely of and substantially across the automobile body, and being generally cresent-shaped, with end portions 33a and 33b extending in directions forwardly of the automobile body 20. A panel comprising two separate sections designated generally at 35 and 36 is provided for covering the opening 33 when the window 30 is in retracted position.

The window 30 is crescent-shaped, being of the so-called "wrap around" type, and extending substantially from end to end of the slot 33. Means are provided for mounting the window on the body of the automobile for movement about an axis of rotation from a retracted position wherein the window is within the opening 33 and entirely below the surface of the rear deck (see Fig. 2) to an extended position wherein the window projects out of the opening 33 above the surface of the rear deck as shown in Fig. 1. This means comprises similar linkage and actuating mechanism at each side of the automobile body. Inasmuch as these mechanism are similar, only one will be described.

An arm 40 has one end connected to the window 30 at the lower edge thereof as shown in Fig. 2, the lower edge of the window carrying a mounting strip 41 and a sealing flange 42 which, together with a trim strip 43 along the upper edge of the window, mounts the window glass. The arm 40 extends forwardly of the automobile body beneath the surface of the rear deck, and a lever arm 44 is connected to the forward end of the arm 40 by means of a bracket 45 which may be welded to the arms 40 and 44. The other end of the arm 44 is keyed to a shaft 46 which is rotatably mounted in a bushing 46a carried by a bracket 47 on the door pillar 24a (Fig. 3). At its other end the shaft 46 bears a second lever arm 48 which is pivotally mounted on the enlarged head 49 of a piston rod 50 projecting from the upper end of a hydraulic cylinder and piston device 51, which in turn is pivotally mounted at its lower end on a bracket 52 secured to a wall of the door pillar 24a.

When the piston rod 50 is retracted in the cylinder 51, as shown in solid lines in Fig. 2, the window 30 is in a retracted position entirely below the surface of the rear deck of the automobile body so that the automobile is completely open-topped. When the piston and cylinder device is actuated to project the piston rod 50 out of the cylinder, as shown in broken lines in Fig. 2, the window 30 is moved through an arcuate path to an extended position as shown fragmentarily in broken lines in Fig. 2 and shown more fully in Fig. 1. When in this position the top 28 may be mounted to extend between the windshield 27 and the rear window 30.

Figs. 4 to 11 show in detail the removable cover comprising the two panel sections 35 and 36, together with yieldable, readily releasable means for securing the panel sections to the body 20. Inasmuch as great wind forces are encountered when the automobile is travelling at high speed, and inasmuch as vibration may occur when the automobile travels over rough roads, the removable cover must be mounted securely so that it will not accidentally come loose and so that it will not rattle. The means for providing such a secure, yet readily removable mounting, will be described only in connection with the panel section 35, it being understood that the panel section 36 is mounted in substantially the same manner.

The removable panel section 35 comprises a body portion having spaced front and rear flanged portions 60 and 61 respectively, between which is mounted a top trim strip 62, rigidity being provided by a bottom portion 63. The flanged portion 60 carries a rubber mounting strip 60a which bears against a depending flange of the deck portion 31, and the portion 61 carries a similar mounting strip 61a.

Referring to Figs. 4 and 5, a rearwardly extending flange 65 projects from the rear body portion 61 and is adapted to abut a plurality of rubber buttons 66 when the rear quarter panel is closed. The buttons 66 are secured in openings in a mounting bracket 67 carried by the rear quarter panels 25 and 25a adjacent the rear edge of the opening 33. A structural bulkhead 80 (Figs. 1, 4, 5 and 11) extends vertically to a position adjacent but spaced from the flange 67 and along its top edge carries a bracket 81 which mounts a sealing strip 82 for sealing the window when in extended position (Fig. 11) and for supporting the flange 65 when the cover panels are in place. At its forwardly turned end the panel section 35 is provided with a finger 68 (Figs. 6 and 7) adapted to enter a grommet 69 carried in a downwardly turned flange 24b at the end of the opening 33.

Referring to Figs. 4, 8, and 9, the panel section 35 is provided at its inner end with a locking member 70 which is pivotally mounted on the panel section 35 and which is utilized as the terminal portion of the trim strip 26 when the removable cover is positioned to close opening 33. The pivotal mounting for the member 70 is provided by means of a dowel or stud 71 which projects downwardly from the member 70 through a grommet 72 in the base portion 63 of the panel section 36 to lock the panel sections 35 and 36 together. At its end the member 70 carries a spring-loaded detent 73 adapted to engage a recess in the end of the trim strip 26. On the stud 71 is mounted an elongated spring clip locking member 75 which turns with the stud 71 to enter a slot 76 (Figs. 9 and 10) in the body portion 31 of the automobile to lock the forward side of the removable panel to the deck lid portion 31. Spring pressure is provided by means of a bumper 77 engaging the spring clip 75.

The above described yieldable, readily releasable securing means holds the cover over the opening 33 without danger of accidental displacement and without rattling, and at the same time the panel sections may readily be removed merely by gripping the member 70 and pivoting it from its solid line position in Fig. 8 to its dotted line position so that the panel sections may be lifted out of the opening 33 when the rear deck is open as illustrated in Fig. 13.

While I have shown and described one embodiment of my invention, it is capable of many modifications. Changes, therefore, in the construction and arrangement may be made without departing from the spirit and scope of the invention as set forth in the appended claims.

I claim:

1. An automobile rear window construction of the character described, including: an automobile body comprising a rear deck having a generally horizontal surface portion with a narrow elongated opening therein, said opening extending transversely of and substantially across said body and being generally crescent-shaped with end portions extending in directions forwardly of said body; a crescent-shaped window; and means for mounting said window on said body for swingable movement in an arcuate path from a retracted position wherein said window is within said opening and entirely below said surface to an extended position wherein said window projects out of said opening, said means comprising a first arm having one end connected to said window at the lower edge thereof and extending forwardly of said body beneath said surface, a lever arm pivotally mounted on said body beneath said surface forwardly of said opening and connected to the other end of said first arm, and a hydraulic cylinder and piston device mounted on said body and connected to said lever arm for pivoting said lever arm to move said window between retracted and extended positions.

2. An automobile rear window construction of the character described, including: an automobile body comprising a rear deck having a generally horizontal surface portion with a narrow elongated opening therein, said opening extending transversely of and substantially across said body and being generally crescent-shaped with end portions extending in directions forwardly of said body; a crescent-shaped rear window; means for mounting said window on said body for pivotal movement about an axis of rotation disposed transversely of said vehicle from a retracted position wherein said window is within said opening and entirely below said surface to an extended position wherein said window projects out of said opening, said means comprising a first arm having one end connected to said window at the lower edge thereof and extending forwardly of said body beneath said surface, a lever arm pivotally mounted on said body beneath said surface forwardly of said opening connected to the other end of said first arm; a hydraulic cylinder and piston device mounted on said body and connected to said lever arm for pivoting said crank to move said window between retracted and extended positions; a removable cover for closing said opening when said window is in retracted position; and yieldable, readily releasable means for securing said cover to said body.

3. An automobile rear window construction of the character described, including: an automobile body comprising a rear deck having a generally horizontal surface portion with a narrow elongated opening therein, said opening extending transversely of and substantially across said body and being generally crescent-shaped with end portions extending in directions forwardly of said body; a crescent-shaped window; means for mounting said window on said body for pivotal movement about an axis of rotation from a retracted position wherein said window is within said opening and entirely below said surface to an extended position wherein said window projects out of said opening, said means comprising a first arm having one end connected to said window at the lower edge thereof and extending forwardly of said body beneath said surface, a lever arm pivotally mounted on said body beneath said surface forwardly of said opening connected to the other end of said first arm; a hydraulic cylinder and piston device mounted on said body and connected to said lever arm for pivoting said crank to move said window between retracted and extended positions; a removable cover for closing said opening when said window is in retracted position; and yieldable, readily releasable means for securing said cover to said body at a plurality of points including both ends of said opening and a plurality of points intermediate said ends and on both sides of said opening.

4. Apparatus of the character claimed in claim 3, wherein said cover comprises two panel sections each secured to said body and secured to each other.

5. An automobile body having a top, side walls and a rear deck with a window receiving pocket therein, a curved window mounted for movement independently of said top and side walls into and out of said pocket, said pocket having a curved entrance opening for said window extending substantially transversely of said body; and a cover for closing said entrance opening when said window is retracted into said pocket, said cover comprising at least one exterior panel section conforming substantially to the shape of said entrance opening, a flange projecting from said panel section; and a plurality of resilient members on said body for engaging said flange.

6. In an automobile body having a retractable arcuate rear window extending transversely of said body, the combination of a deck portion having a window receiving pocket provided therein, the entrance to said pocket having substantially the same shape as said window and extending transversely of said body; a removable cover for closing the entrance to said pocket when said window is in said pocket, said cover comprising a pair of panel sections adapted to cooperatively fit into said entrance and thereby close said pocket, a flange projecting from each of said panels; a plurality of pliable members on said body for resiliently engaging said flanges; and locking means for releasably securing said panels in closed position.

7. In an automobile body having a retractable curved window extending transversely of said body, the combination of a deck portion having a window receiving pocket provided therein, the entrance to said pocket extending substantially transversely of said body; a removable cover for sealing the entrance to said pocket when said window is in said pocket, said cover comprising a plurality of panel sections; a flange projecting outwardly from each of said panel sections; a flange receiving cavity within said pocket; means for resiliently retaining said flange within said cavity; and readily releasable means for securing said cover to said body.

8. Apparatus of the character described, including: an automobile body comprising a foldable top which is movable between raised and lowered positions, side walls and a rear deck having a generally horizontal surface portion with an elongated opening therein, said opening extending transversely of and substantially across said body and being generally crescent-shaped with end portions extending in directions forwardly of said body; a crescent-shaped window; means for mounting said window on said body between the side walls thereof for swinging movement about a fixed axis relative to said top and side walls from a retracted position wnerein said window is within said opening and entirely below said surface to an extended position wherein said window projects out of said opening, comprising a curved hinge arm at each side of the body, one end of each arm being connected to the window and the other end being pivoted on the body adjacent a side wall forwardly of the window to provide space for said top in lowered position.

9. Apparatus of the character described, including: an automobile body comprising a foldable top which is movable between raised and lowered positions, side walls and a rear deck having a generally horizontal surface portion with an elongated opening therein, said opening extending transversely of and substantially across said body; a crescent-shaped rear window; means for mounting said window on said body between said side walls for swinging movement relative to said top and side walls comprising a curved hinge arm at each side of the body, one end of each arm being connected to the window and the other end being pivoted on the body adjacent a side wall forwardly of the window to provide space for said top in lowered position; and means for swinging said hinge arms about a fixed axis of rotation to move said window from a retracted position wherein said window is within said opening and entirely below said surface to an extended position wherein said window projects from said opening.

References Cited in the file of this patent

UNITED STATES PATENTS

| 1,935,468 | Dittus | Nov. 14, 1933 |
| 1,940,444 | Burgman | Dec. 19, 1933 |
| 2,033,750 | Westrope | Mar. 10, 1936 |
| 2,289,173 | Best | July 7, 1942 |
| 2,306,575 | Tuttle | Dec. 29, 1942 |
| 2,439,863 | Rappl | Apr. 20, 1948 |

FOREIGN PATENTS

| 629,829 | Germany | May 13, 1936 |
| 6,130 | Great Britain | Mar. 12, 1913 |
| 326,211 | Italy | May 6, 1935 |
| 436,605 | Italy | June 10, 1948 |
| 68,583 | Switzerland | Apr. 1, 1915 |

OTHER REFERENCES

"Automotive Industries" (magazine) Dec. 15, 1948, page 19 only.